A. HAWORTH.
WEEDER OR CULTIVATOR.
APPLICATION FILED APR. 7, 1914.

1,144,196.

Patented June 22, 1915.

A. Haworth Inventor

Witnesses
By W. T. Fitzgerald & Co.
Attorneys

UNITED STATES PATENT OFFICE.

ALLEN HAWORTH, OF MABTON, WASHINGTON.

WEEDER OR CULTIVATOR.

1,144,196.  Specification of Letters Patent.  Patented June 22, 1915.

Application filed April 7, 1914. Serial No. 830,181.

*To all whom it may concern:*

Be it known that I, ALLEN HAWORTH, a citizen of the United States, residing at Mabton, in the county of Yakima and State of Washington, have invented certain new and useful Improvements in Weeders or Cultivators; and I do hereby declare the following to be a full, clear, and exact description of the invention, such as will enable others skilled in the art to which it appertains to make and use the same.

This invention relates to weeders or cultivators and has for one of its objects the production of a device for efficiently cultivating the ground for the purpose of eradicating the same of all obnoxious weeds contained therein.

A further object of this invention resides in the construction of a weeder or cultivator for efficiently destroying obnoxious weeds regardless of the foulness of the land.

A still further object of this invention is the provision of means for preventing the machine from becoming choked with the foul grasses, etc., which may be upon the land. And a still further object of this invention resides in the provision of means for efficiently locking the revolving knives against rotation for maintaining certain of the same in operative position. And another object of this invention resides in the provision of means for efficiently adjusting the locking means for regulating the depths of the cutting knives relative to the ground and the further provision of means for retaining the locking means out of engagement with the revolving knives, whereby the cultivator may be readily transported from one field to another.

Figure 1:
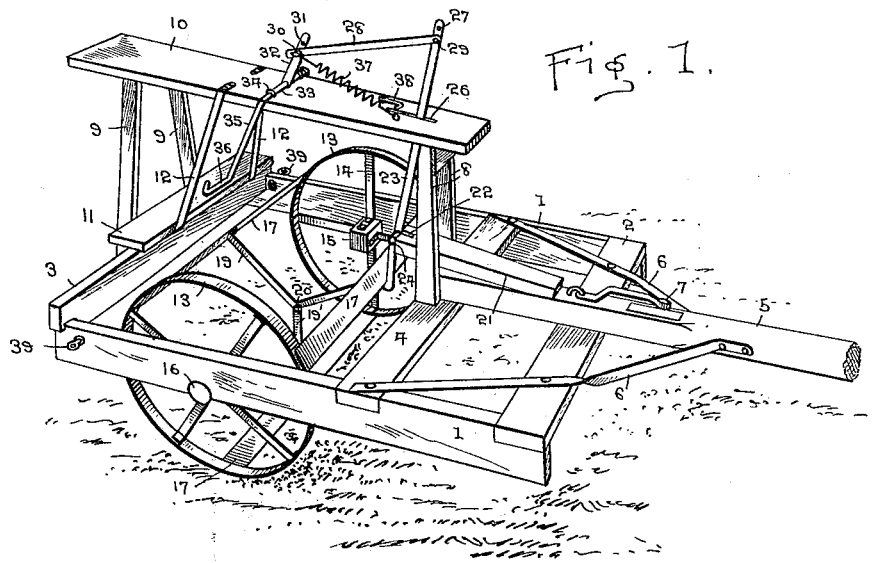
Figure 2:
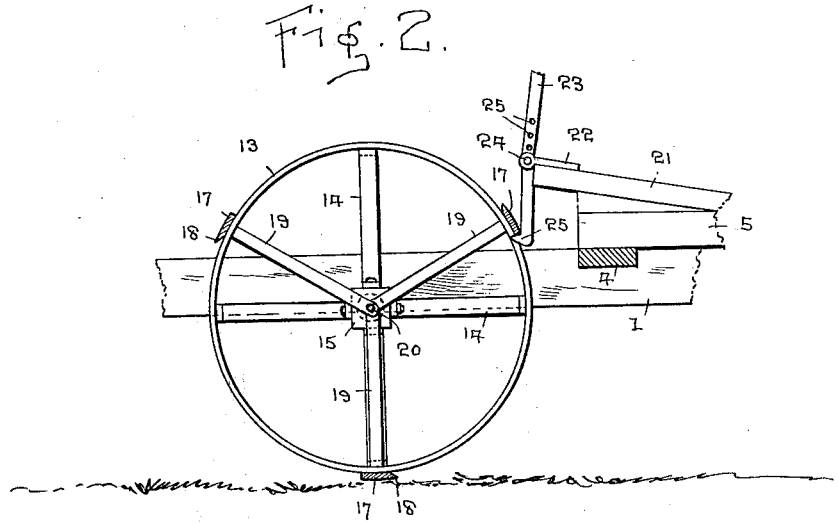

These and other objects will more fully appear and the nature of the invention more clearly understood, by the construction, combination and arrangement of parts thereof as described in the following specification, defined in the appended claims and illustrated in the accompanying drawings, in which, Figure 1 is a perspective view of the weeder or cultivator showing the same in its complete form ready for operation. Fig. 2 is a fragmentary detail view, partly in section, illustrating the manner of mounting the adjustable locking means showing the same in engagement with one of the cutting knives for preventing the rotation of the wheels and knives.

Referring to the drawings, 1 denotes the side bars of the frame, 2 the front bar and 3 the rear bar thereof, and upon the side bars 1 at the rear of the front bar 2 is the transverse supporting bar 4. Secured to the bars 2 and 4 in any suitable manner is the tongue 5 rigidly secured to the frame of the machine by the brace bars 6, the tongue being also provided with the usual draft appliances 7.

Arranged upon the supporting bar 4 at each side of the inner ends of the tongue 5 are the vertical supports 8, and arranged upon the rear bar 3 of the frame are the two vertical supports 9 upon the upper ends of which and the supports 8 is arranged the platform or seat 10, and also arranged upon the rear bar 3 is the foot rest 11 supported by the brace rods 12, which rods extend upwardly and engage the upper surface of the platform or seat 10 for retaining the same upon the vertical supports 8 and 9 respectively.

Arranged within the frame and adjacent each of the side bars 1 are the wheels 13 provided with the spokes 14 the inner ends of which are secured to the hubs 15, preferably square, though the same may be round if so desired, the hubs 15 being provided with the stub shafts 16 each mounted in suitable journals arranged in the lower edges of the side bars 1 of the frame.

Secured to the peripheries of the wheels 13 in any suitable manner and extending transversely of the machine from wheel to wheel are a plurality of cutting knives 17 each provided with the cutting edge 18, the edge 18 being formed by outwardly beveling the blades 17 for the more efficient engagement with the ground. The knives, which are here shown as three in number, are each provided with the brace bars 19 the inner ends of which are secured to a common pivot member 20 arranged in the plane of the axial alinement of the wheels 13, these brace bars 19 being arranged at the inner sides of the center of the knives for preventing the buckling of the same, thus maintaining the knives in strict longitudinal alinement.

Arranged upon the top of the inner end of the tongue 5 and projecting slightly beyond the same is the block 21 having arranged upon the projecting end thereof the hinge member 22 in which is pivotally mounted the locking lever 23 through the medium of the bolt 24 passing through the ears of the hinge member 22 and one of the series of apertures 25 formed in the locking lever 23 in proximity to the lower end thereof. Upon the lower extremity of the lever 23 is provided the lug or hook 25 which is designed to engage the back of one of the knives 17 for preventing the rotation of the wheels 13 for maintaining one of the plurality of the knives in constant engagement with the ground.

The locking lever 23 projects upwardly and extends through an elongated slot 26 formed in the forward end of the platform or seat 10 and has arranged at its upper end a series of apertures 27, and connected to the lever 23 is the link 28 pivotally connected to the lever 23 through the medium of the bolt 29 passing through one of the apertures 27. The opposite end of the link 28 is pivotally connected through the medium of the pivot bolt 30 passing through one of the series of apertures 31 formed in the upper end of the rocking lever 32, the lever 32 being provided with the rock shaft 33 suitably mounted upon the upper side of the platform or seat 10 by any suitable means as shown at 34. The rock shaft 33 is provided with the depending arm 35 the lower end of which is bent to form the foot rest 36.

For normally holding the locking lever 23 in engagement with certain of the knives 17 is the spring 37 having one end attached to the pivot bolt 30 and the opposite end secured upon the upper face of the seat 10. For maintaining the locking lever 23 out of engagement with the knives 17 the hook 38 is provided for engaging the lever 23 and retaining the same rearwardly within the slot 26.

Adjacent the rear end of the side bars 1 of the frame are provided the eye bolts 39 for attaching a harrow or other pulverizing means thereto for pulverizing and smoothing the land in the wake of the cutting knives 17.

When the machine is in active operation in the field the locking lever 23 engages the rear of one of the knives 17 through the medium of the hook or lug 25 for preventing the rotation of the wheels 13 thus positioning one of the knives 17 in engagement with the ground, the lever 23 being held in normal operative position through the medium of the retractile spring 37 for forcing the upper end of the lever forwardly. For regulating the depth of the knives 17 in the ground, the lever 23 is provided with a series of apertures 25 for adjusting the height of the hook 25 for lowering the locking position of the knives 17 whereby the cutting edge 18 of the knives 17 are positioned slightly rearwardly of the vertical axial line of the wheels 13 whereby the cutting edge 18 is designed to enter the ground at a greater depth. The positioning of the lever 23 relative to the knives 17 may also be adjusted by the changing of the link 28 within the apertures 27 of the lever 23 and the apertures 31 in the upper end of the rocking lever 32 for the more positive engagement therewith.

For preventing the choking of the machine when operating in foul land, I have provided the foot lever 36 positioned within easy reach of the operator of the machine, and by forcing the foot lever 36 forwardly, the rock lever 32 and the connecting link 28 necessarily draws the upper end of lever 23 in a rearward direction thus unlocking the hook or lug 25 from engagement with the knife 17, which movement permits the wheels 13 to revolve until the hook 25 of the locking lever 23 engages the next succeeding knife which is accomplished by the removal of the foot from the foot lever 36 due to the action of the retractile spring 37 forcing the upper end of lever 23 again in its forward direction, thus preventing the choking of the machine in a ready and efficient manner.

While I have here shown and described the preferred embodiment of my invention, I hereby reserve the right to make such alterations and variations therein as I may deem expedient but which will neither depart from the spirit of this invention nor conflict with the scope of the claims.

Having thus fully described my invention, what I claim as new and desire to secure by Letters Patent of the United States is:

1. In a weeder, comprising a frame, a tongue for said frame, a seat arranged upon said frame, wheels having their hubs provided with stub shafts journaled in said frame, cutting blades embracing said wheels, and radially disposed bars, having their outer ends secured to the center of said blades and their inner ends pivoted together in alinement with said stub shafts, for bracing said blades.

2. In a weeder, comprising a frame, a tongue for said frame, a seat arranged upon said frame, wheels journaled in said frame, cutting blades embracing said wheels, said blades having outwardly beveled cutting edges, means for locking said wheels with a cutting blade in operative position, and means for adjusting said locking means to vary the cutting angle of said blades.

3. In a weeder, comprising a frame, a tongue for said frame, a longitudinal seat bar arranged upon said frame, wheels journaled in said frame, cutting blades embracing said wheels, means for locking said wheels against rotation for positioning certain of said blades in operative position, a shaft revolubly mounted upon said seat bar, an operating stirrup depending from said shaft, an upstanding arm upon said shaft, and a bar connecting said locking means with said upstanding arm for releasing said locking means.

In testimony whereof I have signed my name to this specification in the presence of two subscribing witnesses.

ALLEN HAWORTH.

Witnesses:
G. N. ROOKER,
JOHN M. JOHNSTON.

Copies of this patent may be obtained for five cents each, by addressing the "Commissioner of Patents, Washington, D. C."